(12) United States Patent
Nakano

(10) Patent No.: US 8,278,789 B2
(45) Date of Patent: Oct. 2, 2012

(54) BICYCLE GENERATOR HUB

(75) Inventor: Keisuke Nakano, Osaka (JP)

(73) Assignee: Shimano Inc., Osaka (JP)

( * ) Notice: Subject to any disclaimer, the term of this patent is extended or adjusted under 35 U.S.C. 154(b) by 254 days.

(21) Appl. No.: 12/821,215

(22) Filed: Jun. 23, 2010

(65) Prior Publication Data

US 2011/0156543 A1    Jun. 30, 2011

(30) Foreign Application Priority Data

Dec. 25, 2009   (JP) ................................ 2009-293762

(51) Int. Cl.
    *H02K 7/18* (2006.01)
(52) U.S. Cl. .................................... 310/67 A; 310/75 C
(58) Field of Classification Search ................ 310/67 A, 310/75 C, 156.53, 156.56
    See application file for complete search history.

(56) References Cited

U.S. PATENT DOCUMENTS

| | | | | |
|---|---|---|---|---|
| 4,331,918 A | * | 5/1982 | Dunch | 324/174 |
| 6,093,985 A | * | 7/2000 | Chen | 310/67 A |
| 6,409,197 B1 | * | 6/2002 | Endo et al. | 280/288.4 |
| 6,605,884 B2 | * | 8/2003 | Nishimoto | 310/67 A |
| 7,002,280 B2 | * | 2/2006 | Endo | 310/263 |
| 7,048,546 B2 | * | 5/2006 | Endo | 439/36 |
| 2004/0189112 A1 | * | 9/2004 | Fujii et al. | 310/67 A |
| 2004/0262065 A1 | * | 12/2004 | Horiuchi | 180/205 |
| 2005/0035572 A1 | * | 2/2005 | Horiuchi et al. | 280/283 |
| 2005/0285461 A1 | * | 12/2005 | Kitamura et al. | 310/67 A |
| 2008/0048530 A1 | * | 2/2008 | Peng et al. | 310/67 A |

FOREIGN PATENT DOCUMENTS

| | | |
|---|---|---|
| DE | 44 42 869 A1 | 6/1996 |
| EP | 1 592 114 A1 | 5/2003 |
| JP | 58-46858 A | 3/1983 |
| JP | 2004-299418 A | 10/2004 |
| JP | 2007-135358 A | 5/2007 |
| JP | 2008-014443 A | 1/2008 |

* cited by examiner

*Primary Examiner* — Thanh Lam
(74) *Attorney, Agent, or Firm* — Global IP Counselors, LLP

(57) ABSTRACT

A bicycle generator hub is provided that mainly includes a hub shaft, a hub shell a stator and a magnet. The hub shell is rotatably arranged on the hub shaft. The stator is fixed to the hub shaft. The magnet is arranged in the hub shell such that it faces opposite the stator. The hub shell includes a magnet holder having the magnet embedded in the magnet holder. Material of the magnet holder is disposed on both oppositely facing axial faces such that the magnet holder retains the magnet as an integral unit.

12 Claims, 12 Drawing Sheets

BICYCLE GENERATOR HUB

CROSS-REFERENCE TO RELATED APPLICATIONS

This application claims priority under 35 U.S.C. §119 to Japanese Patent Application No. 2009-293762, filed Dec. 25, 2009. The entire disclosure of Japanese Patent Application No. 2009-293762 is hereby incorporated herein by reference.

BACKGROUND

1. Field of the Invention

This invention generally relates to a hub. More specifically, the present invention relates to a generator hub for mounting to a bicycle frame.

2. Background Information

In recent years, many bicycles have been provided with electrical components such as lights, electrically controlled suspensions, electronic shifting, etc. To supply electrical power to theses electrical components, some bicycle have been provided with an electric generator hub. One example of an electric generator hub is disclosed in Japanese Laid-Open Patent Publication No. 2004-299418. This generator hub serves as a hub that is positioned at a center of a wheel of a bicycle. The generator hub has an electric generator mechanism for generating electrical power. The generator hub of this publication has a hub shaft, a hub shell a stator and a magnet (permanent magnet). The hub shell is arranged around an outside periphery of the hub shaft. The stator is fixed to the hub shaft and functions as an armature. The magnet (permanent magnet) is fixed to the hub shell. The stator includes a coil and a yoke arranged on an outside peripheral portion of the coil. The hub shell includes a cylindrical shell body and a lid member configured to cover one end of the shell body. A cylindrical magnet or a plurality of magnets arranged in a generally cylindrical form are fixed to an internal circumferential surface of the shell body with an adhesive or other appropriate fastening technique.

SUMMARY

As explained above, in a conventional generator hub, the magnet (or magnets) is fixed to an internal circumferential surface of the hub shell with an adhesive or other technique. Consequently, a gap between the stator and a radially inward facing surface of the magnet varies depending on the manner in which the magnet has been set with the adhesive and it is difficult to arrange the magnet in a precise fashion.

One object of the present disclosure is to provide a generator hub in which the magnet is arranged with good precision.

In view of the state of the known technology, a generator hub is disclosed in accordance with a first aspect of the disclosure that mainly comprises a hub shaft, a hub shell, a stator and a magnet. The hub shell is rotatably arranged on the hub shaft. The stator is fixed to the hub shaft. The magnet is arranged in the hub shell such that it faces opposite the stator. The hub shell includes a magnet holder having the magnet embedded in the magnet holder. Material of the magnet holder is disposed on both oppositely facing axial faces such that the magnet holder retains the magnet as an integral unit. By retaining the magnet with a magnet holder such that the magnet holder is integral with the magnet, the magnet can be arranged more precisely than if the magnet is fixed using an adhesive. As a result, there is less variation of the gap between the stator and the magnet and the output of the generator can be stabilized. Since the gap between the magnet and the stator can be managed precisely, a smaller gap can be achieved between the magnet and the stator and the electricity generation efficiency can be improved.

In accordance with a second aspect of the disclosure, the generator hub according to the first aspect is further configured such that the hub shell is rotatably support on the hub shaft by a bearing that includes a ball bearing member, with the ball bearing member being embedded in the magnet holder such that the ball bearing member is part of the integral unit that includes the magnet holder and the magnet. With this aspect, the magnet holder holds a ball bearing member of a bearing in addition to the magnet as an integral unit. As a result, the ball bearing member can be attached with greater precision.

In accordance with a third aspect of the disclosure, the generator hub according to the second aspect is further configured such that the magnet holder is primarily a synthetic resin member, while the ball bearing member is a metal member. The ball bearing member has a ball bearing section and a reinforcement section arranged on an outside periphery of the ball bearing section. With this aspect, the weight of the hub shell can be reduced.

In accordance with a fourth aspect of the disclosure, the generator hub according to the third aspect is further configured such that the ball bearing member includes a ball bearing portion and a reinforcing portion, with the reinforcing portion extending from an outer circumferential portion of the ball bearing portion in a substantially radial direction with respect to the hub shaft. With this aspect, the synthetic resin magnet holder is reinforced by the reinforcing portion of the metal ball bearing member and the weight of the hub shell can be reduced while also maintaining its strength.

In accordance with a fifth aspect of the disclosure, the generator hub according to any one of the first to fourth aspects is further configured such that the hub shell includes a cylindrical shell body and a lid member, with the cylindrical shell body having an axially facing opening at one end and the lid member being at least partially closing the axially facing opening of the shell body, the lid member includes the magnet holder. In this aspect, the magnet holder is formed integrally with the lid member and the magnet can be fixed precisely to the lid member. Since an existing shell body can be used, the size of the gap between the magnet and the stator can be stabilized easily.

In accordance with a fourth aspect of the disclosure, the generator hub according to any one of the first to fourth aspects is further configured such that the hub shell includes a cylindrical shell body and a lid member, with the cylindrical shell body having an axially facing opening at one end and the lid member being at least partially closing the axially facing opening of the shell body, the shell body includes the magnet holder. In this aspect, the magnet holder is formed integrally with the shell body and the magnet can be fixed precisely to the shell body. Also, with this aspect, the size of the gap between the magnet and the stator can be stabilized easily regardless of the material and structure of the lid member.

These and other aspects, features, objects and advantages of the present disclosure will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
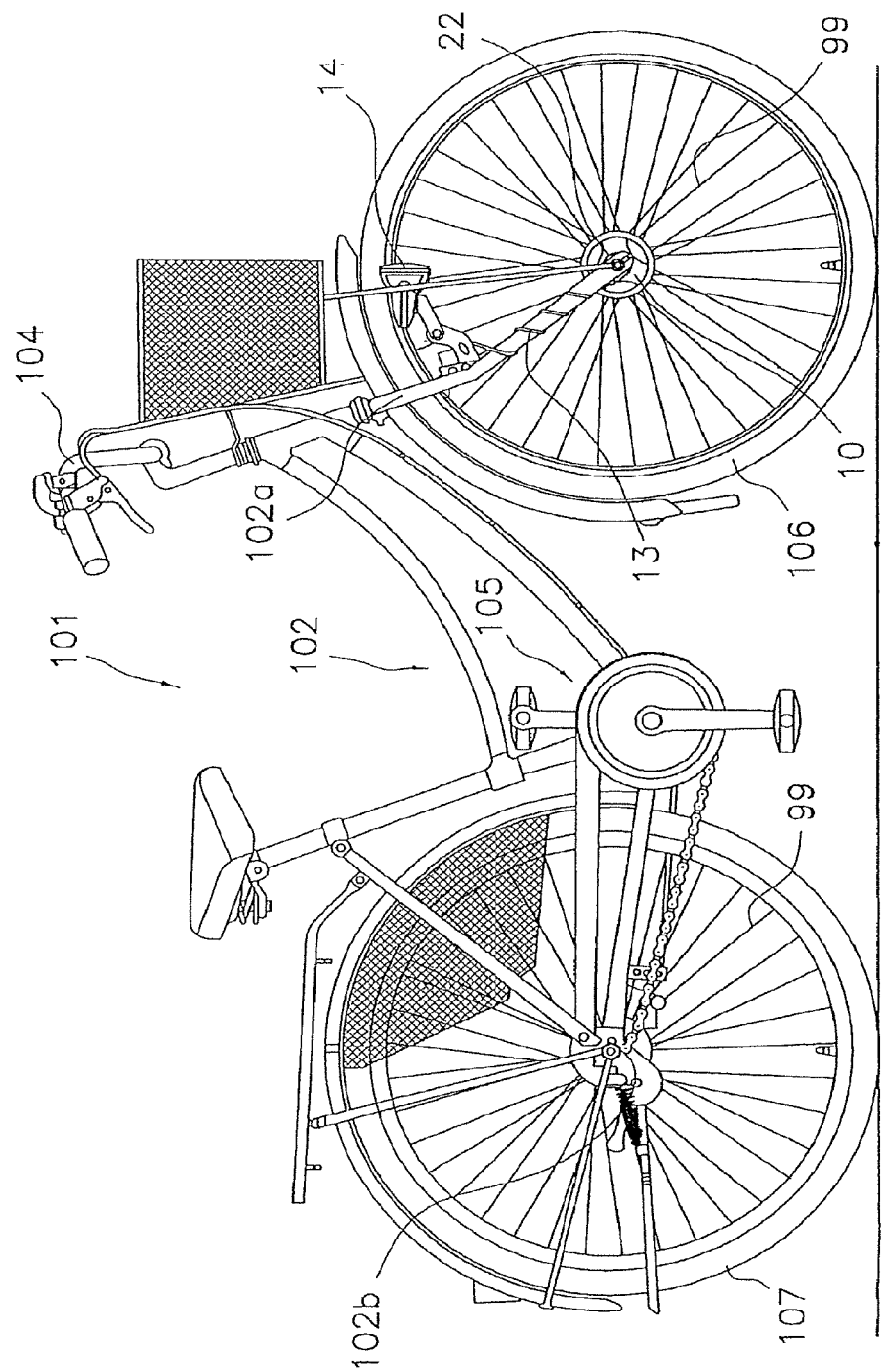
FIG. 1 is a side elevational view of a bicycle that is equipped with a generator hub (hub dynamo) in accordance with a first embodiment.

Referring initially to FIG. 1, a bicycle 101 is illustrated with a bicycle generator hub 10 in accordance with a first embodiment. An external wire 13 electrically connects a front lamp 14 to the generator hub 10 such that the front lamp 14 receives electrical power from the generator hub 10 through the external wire 13. The bicycle 101 includes a frame 102 having a front fork 102a, a handlebar 104, a drive unit 105, a front wheel 106 and a rear wheel 107. The generator hub 10 is installed on the front wheel 106 of this bicycle 101. The drive unit 105 includes a chain, pedals and the like. The front and rear wheels 106 and 107 are bicycle wheels having a plurality of spokes 99. Rotation of the front wheel 106 causes electric power to be generated by the generator hub 10 such that the electric power is supplied through the external wire 13 to the front lamp 14 that is equipped with a light sensor. The rear wheel 107 is mounted on rear fork ends 102b provided on a rear end portion of the frame 102.

Figure 2:
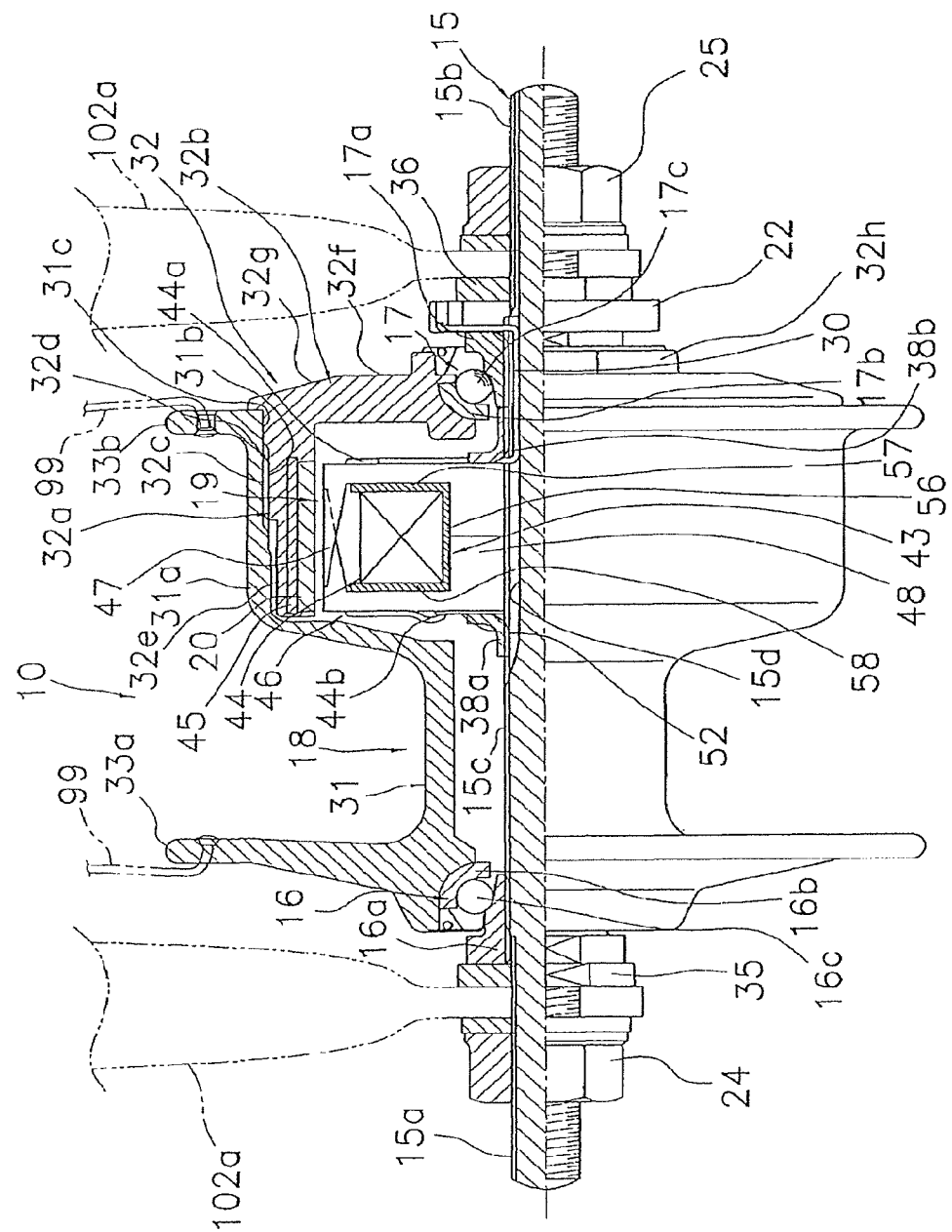
FIG. 2 is partial cross-sectional view of the generator hub illustrated in FIG. 1 in accordance with the first embodiment.
Figure 3:
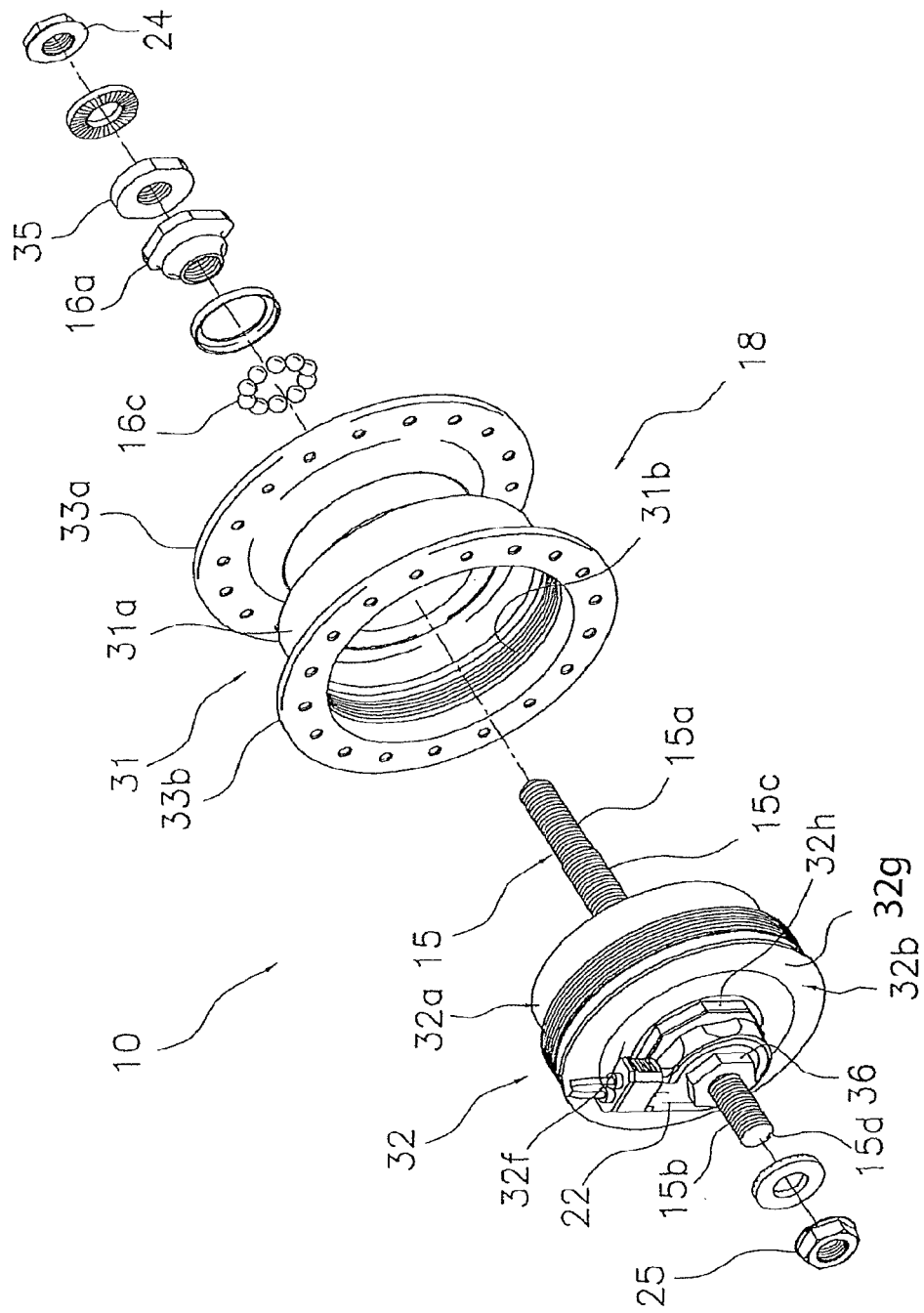
FIG. 3 is an exploded perspective view of the generator hub illustrated in FIGS. 1 and 2.

As shown in FIGS. 1 to 3, the generator hub 10 is attached to a distal end of the front fork 102a together with the front wheel 106 of the bicycle. The generator huh 10 includes a hub shaft 15 fixed to the front fork 102a, a hub shell 18, a stator 19, a magnet (permanent magnet) 20. As explained below, the hub shell includes a magnet holder 21 that retains the magnet 20. The generator hub 10 has a connector 22 for connecting to the external wiring 13 to convey electric power generated at the stator 19.

Figure 4:
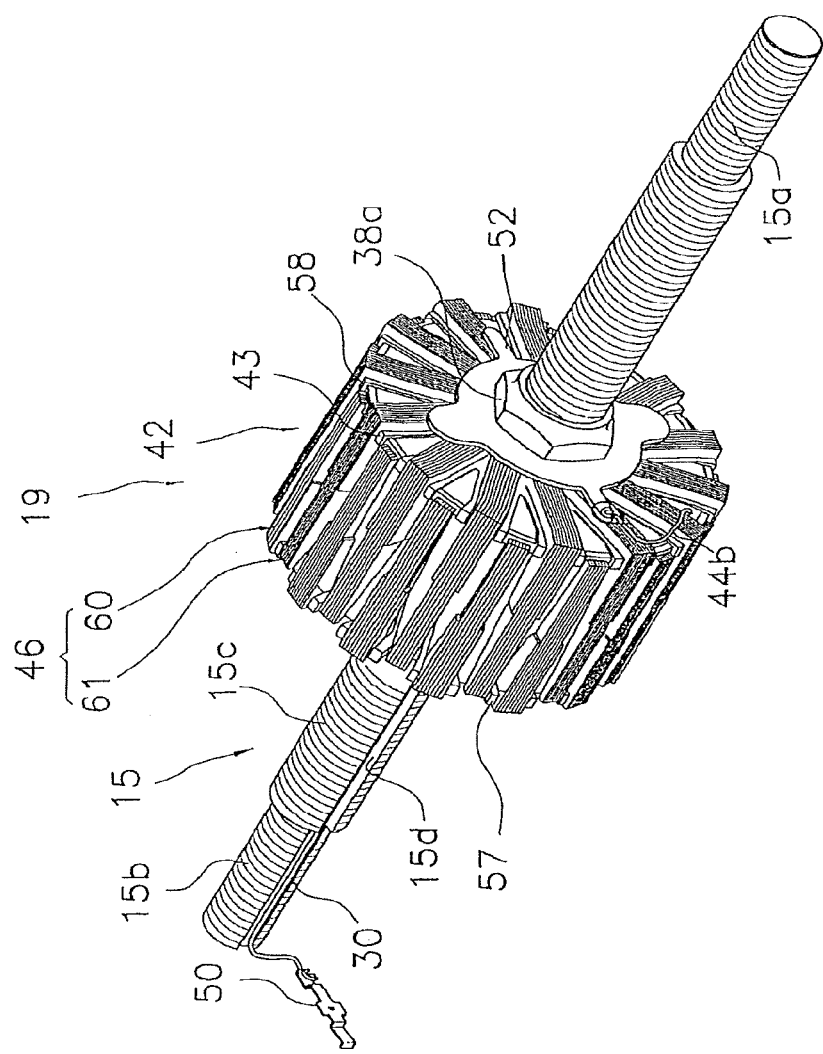
FIG. 4 is a perspective view of an internal stationary unit of the generator hub illustrated in FIGS. 1 to 3.

The hub shaft 15 is a shaft member having both ends fixed non-rotatably to the front fork 102a with a first fastening nut 24 and a second fastening nut 25. As shown in FIGS. 2, 3 and 4, the hub shaft 15 has a first externally threaded portion 15a, a second externally threaded portion 15b and a third externally threaded portion 15c. The first externally threaded portion 15a is located at a first end of the hub shaft 15, while the second externally threaded portion 15b is located at a second end of the hub shaft 15 that is opposite from the first externally threaded portion 15a. The third externally threaded portion 15c has a larger diameter than the first and second externally threaded portions 15a and 15b, which have the same diameter. The third externally threaded portion 15c is arranged between the first externally threaded portion 15a and the second externally threaded portion 15b. A wire passage groove 15d is formed in an outside circumferential surface of the hub shaft 15 for passing an internal wire 30 that is connected between the stator 19 and the connector 22. The wire passage groove 15d spans from a portion where the stator 19 is mounted to a rightward end portion (rightward from the perspective of FIG. 2) of the second externally threaded portion 15b.

The hub shell 18 is rotatably arranged on the hub shaft 15 by a first bearing 16 and a second bearing 17, which are arranged on an outside circumference of the hub shaft 15. The hub shell 18 includes a shell body 31 and a lid member 32. The shell body 31 has a first end rotatably supported on the hub shaft 15 and a second end provided with a large diameter opening portion 31c. The lid member 32 is arranged on the shell body 31 such that the lid member 32 covers the opening portion 31c formed in the second end (rightward end in FIG. 2) of the shell body 31. The shell body 31 is a cylindrical member that is configured to extend along an axial direction of the hub shaft 15. The shell body 31 and the lid member 32 are made of a hard rigid material such as, for example, a die casted aluminum alloy. The shell body 31 has a bulged portion 31a at its second end (right-hand end in FIG. 2). The bulged portion 31a bulges outwardly in a radial direction with respect to the hub shaft 15 in comparison to a first end of the shell body 31. An internally threaded portion 31b is formed on an internal circumferential surface of the second end side of the bulged portion 31a. A first hub flange 33a and a second hub flange 33b are formed on external circumferential surfaces at opposite ends of the shell body 31. The first hub flange 33a and the second hub flange 33b are both configured such that radially inward end portions of the spokes 99 can be hooked thereon. The first hub flange 33a and the second hub flange 33b constitute a spoke attachment structure of the hub shell 18.

In the first embodiment, the entire lid member 32 constitutes the magnet holder (the magnet holder is defined by the lid member 32). The lid member 32 has a threaded cylindrical portion 32a and a rotary support portion 32b. The threaded cylindrical portion 32a screws into an internal surface of the bulged portion 31a of the shell body 31. The rotary support portion 32b has a circular disc shape. The rotary support portion 32b is rotatably mounted to the hub shaft 15. The threaded cylindrical portion 32a has a first cylindrical portion 32d and a second cylindrical portion 32e. The first cylindrical portion 32d is provided with an externally threaded portion 32c that screws into the internally threaded portion 31b of the shell body 31. The second cylindrical portion 32e extends from a tip end of the first cylindrical portion 32d toward the first end and serves as a section in which to arrange the magnet 20. The first cylindrical portion 32d fits into the opening portion 31c of the bulged portion 31a such that the first cylindrical portion 32d is arranged coaxially with respect to the shell body 31. The lid member 32 is thus screw-fastened to the shell body 31 by the threaded cylindrical portion 32a.

The lid member 32 is further provided with a planer portion 32f, tapered portion 32g and a boss 32h that are formed on an outward face of the rotary support portion 32b. The planer portion 32f is arranged in a plane perpendicular to the hub shaft 15. The tapered portion 32g is slanted slightly inward in an axial direction and extends from a radially outward side of the planar portion 32f. A radially outer portion of the rotary support portion 32b abuts against an outward face of the second hub flange 33b. The boss 32h is configured to be engaged with a wrench or other tool. The boss 32h is formed to protrude outward from a radially inward portion of the outward face of the lid member 32.

The shell body 31 and the lid member 32 are rotatably supported on the hub shaft 15 by the first and second bearings 16 and 17 that are threaded on the third externally threaded portion 15c of the hub shaft 15 with an axial space in between. The first and second bearings 16 and 17 are angular cup-cone type bearings that can support both axial loads and radial loads.

The first bearing 16 is installed in the shell body 31. The first bearing 16 includes a first ball pushing member 16a, a first ball bearing member 16b and a plurality of first steel balls 16c. The first ball pushing member 16a constitutes an inner race or cone. The first ball bearing member 16b constitutes an outer race or cup. The first steel balls 16c constitutes rolling bodies that arranged between the first ball pushing member 16a and the first ball bearing member 16b. The first ball bearing member 16b is press fitted into the first end of the shell body 31.

The second bearing 17 is installed in the lid member 32. The second bearing 17 includes a second ball pushing member 17a, a second ball bearing member 17b and second steel balls 17c. The second ball pushing member 17a constitutes an inner race or cone. The second ball bearing member 17b constitutes an outer race or cup. The second steel balls 17c constitutes rolling bodies arranged between the second ball pushing member 17a and the second ball bearing member 17b. The first ball pushing member 16a and the second ball pushing member 17a are screwed onto opposite ends of the third externally threaded portion 15c. When the lid member 32 (magnet holder) is die cast, the lid member 32 is formed to incorporate the second ball bearing member 17b integrally by using a mold (die) made for insert molding. In other words, the lid member 32 is die casted or molded over the second ball bearing member 17b such that material of the lid member 32 contacts oppositely facing axial surfaces of the second ball bearing member 17b to retain the axial position of the second ball bearing member 17b with respect to the lid member 32.

The first ball pushing member 16a is positioned and locked with a first lock nut 35 that is screwed onto the first externally threaded portion 15a. The second ball pushing member 17a is positioned and locked with a second lock nut 36 that is screwed onto the second externally threaded portion 15b. In addition to locking the ball pushing member 17a, the second locknut 36 secures the connector 22 to the hub shaft 15.

As shown in FIGS. 2 and 4, the stator 19 is a claw pole type stator that is fixed to the hub shaft 15. The stator 19 includes a bobbin 43, a ring-shaped coil 44 and a claw pole type yoke 46. The ring-shaped coil 44 is wound onto the bobbin 43. The claw pole type yoke 46 surrounds a periphery of the coil 44. The bobbin 43 and the yoke 46 are non-rotatably secured to the hub shaft 15 by a first mounting nut 38a and a second mounting nut 38b that are screwed onto the third externally threaded portion 15c so as to sandwich the bobbin 43 and the yoke 46. The bobbin 43 and the yoke 46 are positioned in the axial direction such that they are housed inside the bulged portion 31a.

As shown in FIG. 2, the bobbin 43 has a cylindrical trunk portion 56, a first flange 57 and a second flange 58. The coil 44 is wound on to an outside circumference of the cylindrical trunk portion 56. The first and second flanges 57 and 58 are formed on opposite axial end portions of the trunk portion 56. The yoke 46 is fitted over side faces of the first and second flanges 57 and 58.

The coil 44 is made of, for example, a metal wire material that is wound onto the bobbin 43. A first end 44a of the coil 44 is exposed on a first side (right end in FIG. 2) of the bobbin 43. The first end 44a of the coil 44 is connected to the internal wire 30. The internal wire 30 is bent radially inward from a connecting portion and bent axially outward (rightward in FIG. 2) at the wire passage groove 15d such that the internal wire 30 extends to a rightward end portion of the hub shaft 15 (rightward end in FIG. 2). At the rightward end of the hub shaft 15, the internal wire 30 is electrically connected to the terminal member 50 shown in FIG. 4. A second end 44b of the coil 44 is exposed on a second side (left end in FIG. 2) of the bobbin 43. The second end 44b of the coil 44 is electrically connected to the hub shaft 15 through a washer member 52 that is fixed to the first mounting nut 38a.

As shown in FIG. 2, the yoke 46 has a stator yoke 47 and a core yoke 48. The stator yoke 47 is arranged between the magnet 20 and the coil 44. The core yoke 48 is arranged between an internal portion of the coil 44 and the hub shaft 15. The core yoke 48 is magnetically coupled to the stator yoke 47. In the first embodiment, the stator yoke 47 and the core yoke 48 are formed as an integral unit. As shown in FIG. 4, the yoke 46 includes a plurality of first laminated yokes 60 and a plurality of second laminated yokes 61. Each of the first and second laminated yokes 60 and 61 is formed by a plurality of plate-like pieces that are laminated together. The first laminated yokes 60 are fitted onto the first flange 57 of the bobbin 43. The second laminated yokes 61 are fitted onto the second flange 58 of the bobbin 43. The first laminated yokes 60 and the second laminated yokes 61 are thus arranged on axially opposite sides of the coil 44 such that the coil 44 is disposed therebetween.

The magnet 20 is arranged in the hub shell 18 such that it faces opposite the stator 19. More specifically, the magnet 20 is arranged in an internal circumferential portion of the threaded cylindrical portion 32a of the lid member 32. The magnet 20 is a cylindrical magnet that is formed by sintering a magnetic metal powder. A pipe-shaped yoke member 45 is formed integrally onto an outer circumferential surface of the magnet 20 using a die. More specifically, the yoke member 45 is formed onto the magnet 20 when the magnet 20 is sintered. When the lid member 32 is die cast, the magnet 20 and the pipe-shaped yoke member 45 are embedded within the lid member 32 using a die. The threaded cylindrical portion 32a of the lid member 32 (e.g., the magnet holder) covers both oppositely facing axial end faces of the cylindrical magnet 20. Thus, the material of the lid member 32 contacts oppositely facing axial surfaces of the magnet 20 and the pipe-shaped yoke member 45 to retain the axial positions of the magnet 20 and the pipe-shaped yoke member 45 with respect to the lid member 32. The magnet 20 is made such that the magnet 20 has a plurality of (e.g., six) magnetic poles separated by equal intervals in a circumferential direction. The magnet 20 is magnetized such that the magnetic poles arranged at equal intervals are north (N) and south (S) poles arranged alternately in the circumferential direction, and the magnet 20 faces opposite the stator yoke 47. While the magnet 20 is a single, one-piece cylindrical magnet in the illustrated embodiment, the magnet 20 can be made of a plurality of individual magnets with the individual magnets being cylindrically arranged. Conventionally, the gap between a magnet and a stator is set to approximately 0.5 mm in order to definitely prevent contact between the magnet and the stator.

However, in the first embodiment, the gap between the stator yoke 47 and the magnet 20 is in a range from approximately 0.2 mm to 0.3 mm.

Electricity generation by the generator hub 10 will now be explained. When the bicycle moves and the front wheel 106, i.e., the hub shell 18, rotates with respect to the hub shaft 15, the magnet 20 rotates with respect to the stator 19 that is fixed to the hub shaft 15. Thus, the magnet 20 rotates around the outside of the coil 44 and the yoke 46. As a result, an alternating magnetic flux passes through the coil 44 and an electric current is generated in the coil 44. That is, the generator hub 10 generates electricity. The generated current passes from the first end 44a of the coil 44 through the internal wire 30 to a connection terminal of the connector 22. From there, the current flows to the front lamp 14 through the external wire 13.

The lid member 32 is formed using a die such that that magnet 20 and the second ball bearing member 17b are both incorporated as an integral unit with the lid member 32. This die casting arrangement allows for the lid member 32 to be precisely arranged so as to be precisely coaxial with respect to the hub shaft 15. In short, the lid member 32 can be used to arrange the magnet 20 in a precise manner. By using the lid member 32 that can arrange the magnet 20 precisely, variation of the gap between the magnet 20 and the stator 19 can be suppressed and the output can be stabilized. Also, since the gap between the magnet 20 and the stator yoke 47 is small, the magnetic flux from the magnet 20 can be conveyed efficiently to the yoke 46 (including the stator yoke 47), resulting in a larger current generated in the coil 44 and improving electricity generation efficiency. Also by using a die to form the lid member 32 having the magnet 20 integrally incorporated therein, the output of the generator hub 10 can be stabilized. Additionally, a gap between the magnet 20 and the stator 19 can be reduced and the electricity generation efficiency can be increased.

Second Embodiment

Figure 5:
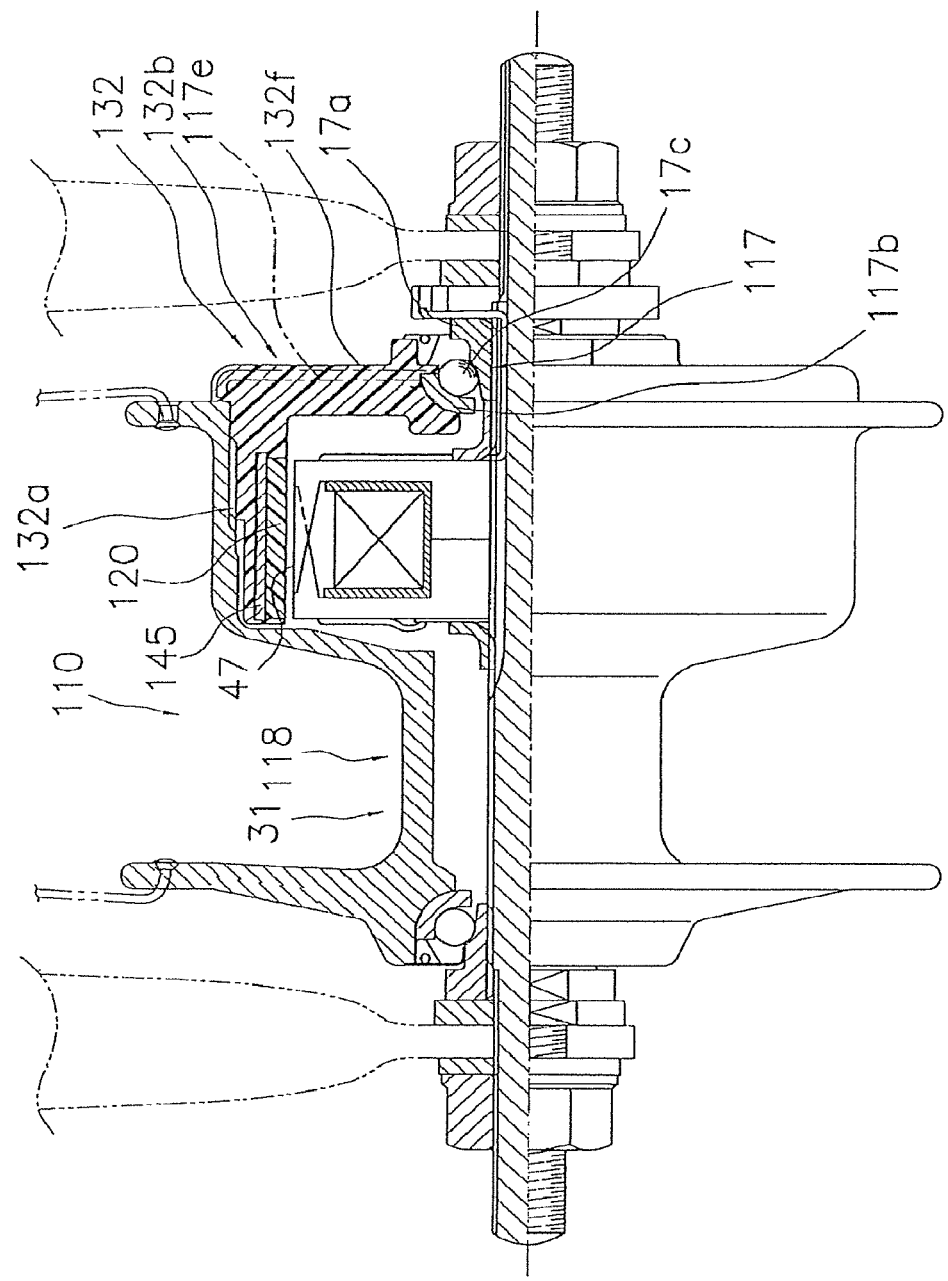
FIG. 5 is partial cross-sectional view, similar to FIG. 2, of a generator hub in accordance with a second embodiment.

Referring now to FIG. 5, a bicycle generator hub 110 according to a second embodiment will now be discussed. The generator hub 110 includes a hub shell 118 having a magnet 120 molded within a lid member 132 according to the second embodiment such that material of the lid member 132 (e.g., the magnet holder) is disposed on both oppositely facing axial faces to retain the magnet 120 as an integral unit with the lid member 132. The structure of the lid member 132 and the magnet 120 of the hub shell 118 are different from the generator hub 10 according to the first embodiment. Otherwise, the constituent features of the second embodiment are the same as in the first embodiment illustrated in FIG. 2. Thus, explanations of parts that are the same as in the first embodiment are omitted for the sake of brevity. In FIG. 5, parts and portions that are shaped differently than in the first embodiment are indicated with reference numerals in the 100s.

Unlike the first embodiment, the lid member 132 shown in FIG. 5 is made using an injection molding process. The lid member 132 is made of a synthetic resin, such as, for example, a polybutylene terephthalate resin, a polyamide resin, a polyacetal resin, or other so-called engineering plastic that is comparatively hard and does not split easily. The lid member 132 has a threaded cylindrical portion 132a and a circular disc-shaped rotary support portion 132b that are shaped similarly to the corresponding portions in the first embodiment. Similarly to the first embodiment, in the second embodiment, the entire lid member 132 constitutes the magnet holder (the magnet holder is defined by the lid member 132). An outward face of the rotary support portion 132b constitutes a planer portion 132f that is arranged in a plane perpendicular to the hub shaft 15. The magnet 120 is a bond magnet made of, for example, a metal magnetic powder blended into a synthetic resin bonding agent and formed into a cylindrical shape. A yoke member 145 is arranged on an outer cylindrical surface of the magnet 120. The yoke member 145 is formed as an integral unit with the magnet 120 by being inserted into a die used to form the magnet 120. The magnet 120 is made such that it has a plurality of (e.g., six) magnetic poles separated by equal intervals in a circumferential direction. The magnet 120 is magnetized such that the magnetic poles arranged at equal intervals are north (N) and south (S) poles arranged alternately in the circumferential direction, and the magnet 20 faces opposite the stator yoke 47. While the magnet 120 is a single, one-piece cylindrical magnet in the illustrated embodiment, the magnet 120 can be made of a plurality of individual magnets with the individual magnets being cylindrically arranged.

The integral unit including the magnet 120 and the yoke member 145 is formed integrally into the lid member 132 using a die when the lid member 132 is injection molded. The threaded cylindrical portion 132a of the lid member 132 covers and contacts both oppositely facing axial end faces of the cylindrical magnet 120. The lid member 132 is also formed to be integral with the second ball bearing member 117b of the second bearing 117 using a die. When the lid member 132 (magnet holder) is molded, the lid member 132 is formed to incorporate the second ball bearing member 117b integrally by using a mold (die) made for insert molding. In other words, the lid member 132 is molded over the second ball bearing member 117b such that material of the lid member 132 contacts oppositely facing axial end surfaces of the second ball bearing member 117b to retain the axial position of the second ball bearing member 117b with respect to the lid member 132.

As a variation of the second embodiment, it is also acceptable for a second reinforcing portion 117e serving to reinforce the lid member 132 to be provided as a separate entity from the second ball bearing member 117b, as indicated with a double-dot chain line in FIG. 5. In FIG. 5, the second reinforcing member 117e is a washer-like member arranged to contact a second ball bearing portion 117d. A radially outer portion of the second reinforcing portion 117e is bent in an axially inward direction. As a result, the strength of the second reinforcing portion 117e is increased. A radially inward portion of the second reinforcing portion 117e contacts the second ball bearing member 117b such that the second reinforcing portion 117e is centered. Similarly to the magnet 120 and the second ball bearing member 117b, the second reinforcing portion 117e is made to be an integral unit with the lid member 132 (in which the magnet holder is provided) when the lid member 132 is made by injection molding. By providing the second reinforcing portion 117e, the lid member 132 can be made out of synthetic resin without causing the overall strength of the lid member 132 to decline and the weight of the generator hub 110 can be reduced.

Third Embodiment

Figure 6:
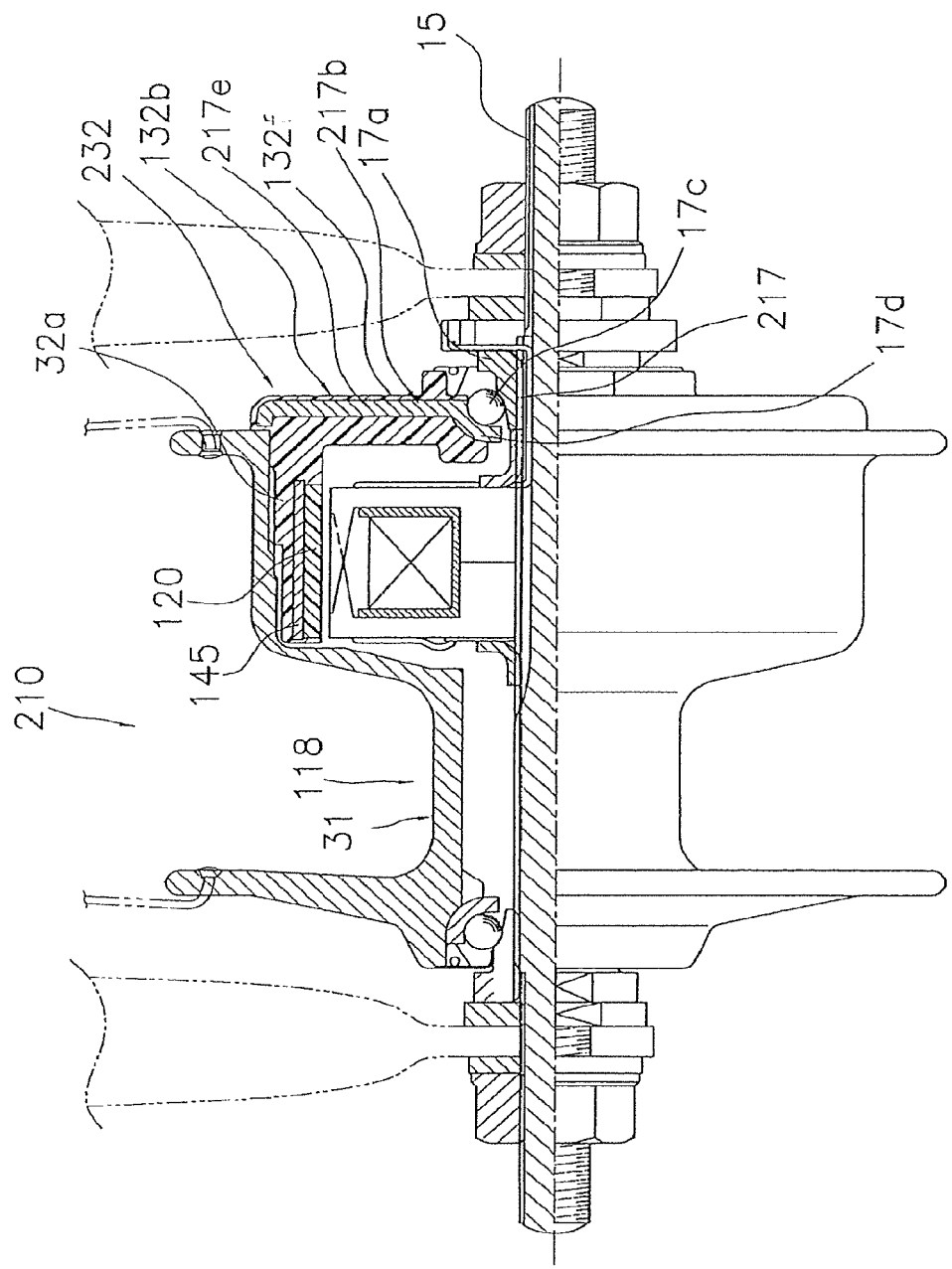
FIG. 6 is partial cross-sectional view, similar to FIG. 2, of a generator hub in accordance with a third embodiment.

Referring now to FIG. 6, a bicycle generator hub 210 according to a third embodiment will now be discussed. In this third embodiment, the generator hub 210 includes the hub shell 118 having the magnet 120 of the second embodiment. The magnet 120 of the second embodiment is disposed in a lid member 232 such that material of the lid member 232 (e.g., the magnet holder) is disposed on both oppositely facing axial faces to retain the magnet 120 as an integral unit with the lid member 232. The generator hub 210 also includes a second bearing 217 with a second ball bearing member 217b according to the third embodiment that is shaped differently than in the second embodiment. Otherwise, the constituent features of the third embodiment are the same as in the second embodiment illustrated in FIG. 5. Thus, explanations of parts that are the same as in the prior embodiments are omitted for the sake of brevity. In FIG. 6, parts and portions that are shaped differently than in the previously explained embodiments are indicated with reference numerals in the 200s.

As shown in FIG. 6, the second ball bearing member 217b of the second bearing 217 includes a cup-shaped second ball bearing portion 217d and a second reinforcing portion 217e. The cup-shaped second ball bearing portion 217d contacts the second steel balls 17c. The second reinforcing portion 217e is provided on an outer circumferential portion of the second ball bearing portion 217d. The second reinforcing portion 217e is substantially shaped like a circular disc. The second reinforcing portion 217e is arranged to extend substantially in a radial direction of the hub shaft 15 from an outer circumferential portion of the second ball bearing portion 217d. A radially outer portion of the second reinforcing portion 217e is bent in an axially inward direction. As a result, the strength of the second reinforcing portion 217e is increased. The lid member 232 is formed by injection molding with a die being used during the injection molding such that the lid member 232 becomes an integral unit with the second ball bearing member 217b as well as with the magnet 120. The second ball bearing member 217b is made by press forming a thin sheet metal material, e.g., a stainless steel sheet or plate.

By providing the second reinforcing portion 117e, the lid member 232 can be made out of synthetic resin without causing the overall strength of the lid member 232 to decline and the weight of the generator hub 210 can be reduced.

Fourth Embodiment

Figure 7:
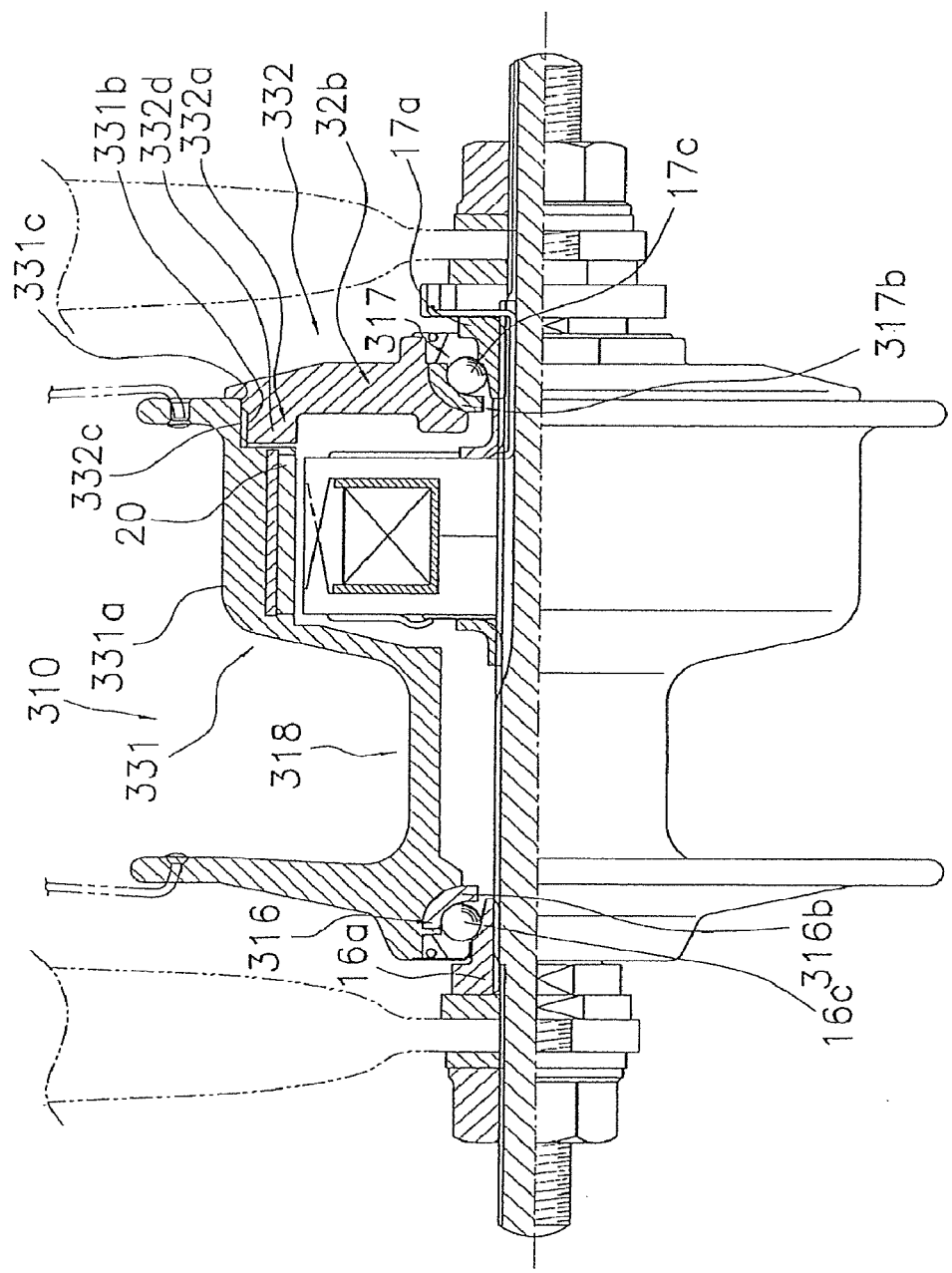
FIG. 7 is partial cross-sectional view, similar to FIG. 2, of a generator hub in accordance with a fourth embodiment.

Referring now to FIG. 7, a bicycle generator hub 310 according to a fourth embodiment will now be discussed. In this fourth embodiment, the generator hub 310 includes a hub shell 318 having the magnet 20 of the first embodiment. The magnet 20 of the first embodiment is embedded in a shell body 331 of the hub shell 318 such that material of the shell body 331 (e.g., a magnet holder) is disposed on both oppositely facing axial faces to retain the magnet 20 as an integral unit with the hub shell 318. Thus, in this fourth embodiment, the generator hub 310 differs from the generator hub 10 of the first embodiment in that the entire shell body 331 corresponds to the magnet holder. In other words, the magnet holder is defined by the shell body 331 in this fourth embodiment. The shell body 331 is formed (molded) using a mold (die) so as to retain the first ball bearing member 316b. In other words, material of the shell body 331 (e.g., the magnet holder) is disposed on both oppositely facing axial faces to retain the first ball bearing member 316b as an integral unit with the shell body 331 and the magnet 20. Also, the second ball bearing member 317b is press fitted into the lid member 332. Otherwise, the constituent features of the fourth embodiment are the same as in the first embodiment illustrated in FIG. 2. Thus, explanations of parts that are the same as in the prior embodiments are omitted for the sake of brevity. In FIG. 7, parts and portions that are shaped differently than in the previously explained embodiments are indicated with reference numerals in the 300s.

Similarly to the first embodiment, the shell body 331 and the lid member 332 of the hub shell 318 shown in FIG. 7 are made of, for example, a die casted aluminum alloy. The shell body 331 (which constitutes a magnet holder) has a bulged portion 331a with the magnet 20 being arranged on an internal circumferential surface of the bulged portion 331a. The shell body 331 covers both end faces of the cylindrical metal magnet 20. The shell body 331 has an opening 331c that is provided in a second end side of the bulged portion 331a of the shell body 331. The diameter of the opening 331c is larger than a portion where the magnet 20 is arranged. The lid member 332 of the hub shell 318 includes a threaded cylindrical portion 332a having an externally threaded portion 332c that meshes with an internally threaded portion 331b of the shell body 331. The externally threaded portion 332c of the threaded cylindrical portion 332a of the lid member 332 is formed in the large diameter portion of the lid member 332.

The lid member 332 has basically the same structure as the lid member 32 of the first embodiment, except that the threaded cylindrical portion 332a does not have a second cylindrical portion and the shape of the first cylindrical portion is different. The lid member 332 is screw-fastened the shell body 331 by the threaded cylindrical portion 332a being screwed into the second end side of the shell body 331. The threaded cylindrical portion 332a has a first cylindrical portion 332d that includes the externally threaded portion 332c. The axial length of the first cylindrical portion 332d is shorter than the axial length of the first cylindrical portion 32d of the first embodiment. Therefore, the overall axial length of the threaded cylindrical portion 332a of the fourth embodiment is shorter than the overall axial length of the threaded cylindrical portion 32a of the first embodiment at least partially because the threaded cylindrical portion 332a does not have a second cylindrical portion. The first cylindrical portion 332d fits into the opening portion 331c of the bulged portion 331a such that it is arranged coaxially with respect to the shell body 331.

As mentioned previously, the shell body 331 is formed such that is an integral unit with the first ball bearing member 316b of the first bearing 316. More specifically, the shell body 331 is formed using a die such that the magnet 20 and the first ball bearing member 316b are incorporated integrally into the shell body 331. Thus, the shell body 332 is precisely arranged to be coaxial with respect to the hub shaft 15. Also, the second ball bearing member 317b is press fitted into the lid member 332.

Fifth Embodiment

Figure 8:
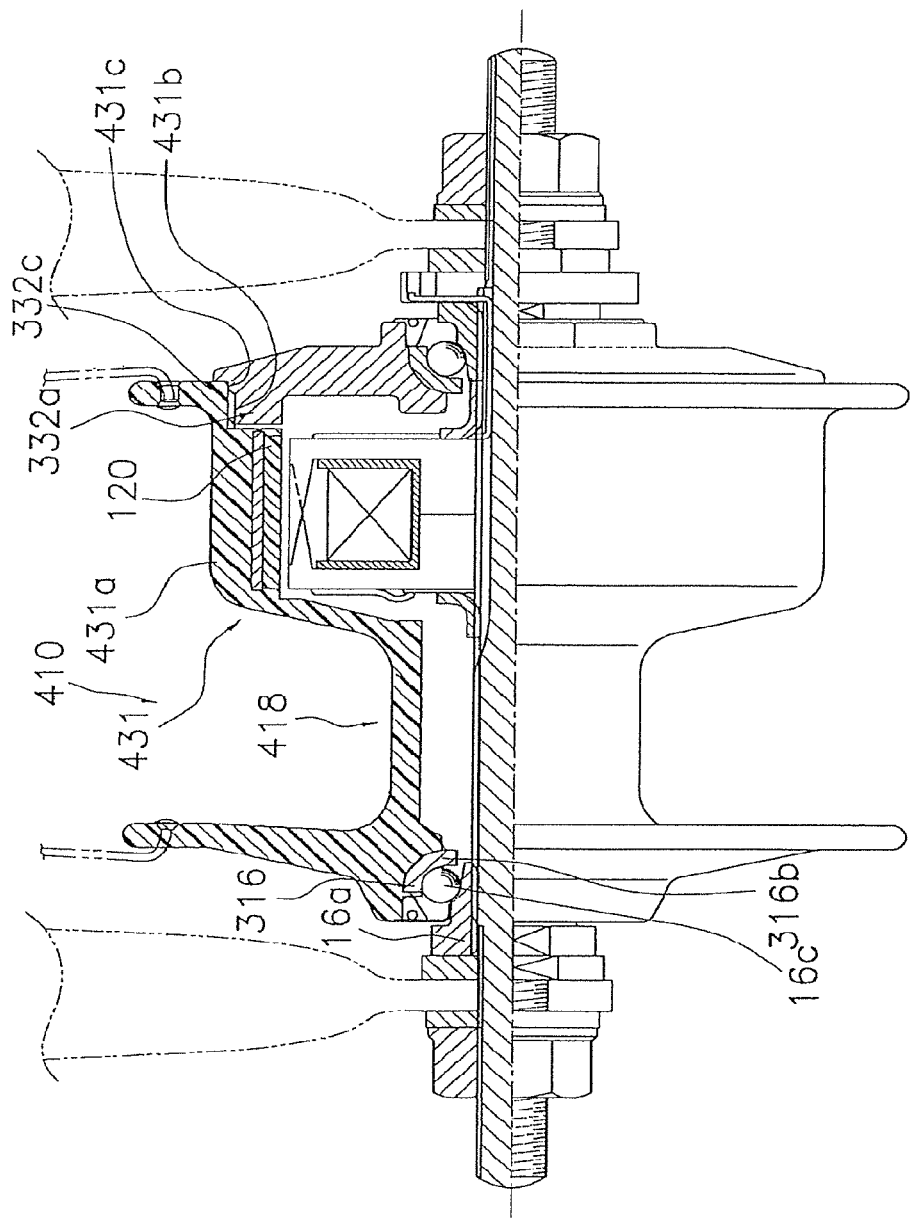
FIG. 8 is partial cross-sectional view, similar to FIG. 2, of a generator hub in accordance with a fifth embodiment.

Referring now to FIG. 8, a bicycle generator hub 410 according to a fifth embodiment will now be discussed. In this fifth embodiment, the generator hub 410 includes a hub shell 418 having the magnet 120 of the second embodiment. The magnet 120 of the second embodiment is embedded in a shell body 431 of the hub shell 418 such that material of the shell body 431 (e.g., a magnet holder) is disposed on both oppositely facing axial faces to retain the magnet 120 as an integral unit with the hub shell 418. The generator hub 410 mainly differs from the fourth embodiment in that the shell body 431 of the hub shell 418 is made of a synthetic resin. The magnet 120 is also different from the fourth embodiment because it is a bond magnet made of a metal magnetic powder blended into a synthetic resin bonding agent as in the second embodiment. Otherwise, the constituent features are the same as the fourth embodiment shown in FIG. 7. Thus, explanations of parts that are the same as in the prior embodiments are omitted for the sake of brevity. In FIG. 8, parts and portions that are shaped differently than in the previously explained embodiments are indicated with reference numerals in the 400s. The magnet 120 is the same as in the second embodiment.

In FIG. 8, the shell body 431 (which constitutes a magnet holder) is injection molded and made of a synthetic resin, such as, for example, a polybutylene terephthalate resin, a polyamide resin, or a polyacetal resin. The magnet 120 is arranged on an internal circumferential surface of a bulged portion 431*a* of the shell body 431. The shell body 431 is configured to cover both end faces of the cylindrical magnet 120. The shell body 431 has an internally threaded portion 431*b*. An opening 431*c* is provided in a second end side of the bulged portion 431*a* of the shell body 431. The internally threaded portion 431*b* is formed in the opening 431*c*. The diameter of the opening 431*c* is larger than a portion where the magnet 120 is arranged. The lid member 432 includes a threaded cylindrical portion 432*a* having an externally threaded portion 432*c* An internally threaded portion 431*b* meshes with the externally threaded portion 432*c* of the threaded cylindrical portion 432*a* of the lid member 432.

The magnet 120 is a bond magnet as explained previously. When the shell body 431 is injection molded, a die is used such that the shell body 431 is formed to be an integral unit with the magnet 120 and the first ball bearing member 316*b* of the first bearing 316. In other words, the shell body 431 is formed (molded) using a mold (die) so as to retain the magnet 120 and the first ball bearing member 316*b*. In other words, material of the shell body 431 (e.g., the magnet holder) is disposed on both oppositely facing axial faces of the magnet 120 and the first ball bearing member 416*b* to retain them as an integral unit with the shell body 431.

Sixth Embodiment

Figure 9:
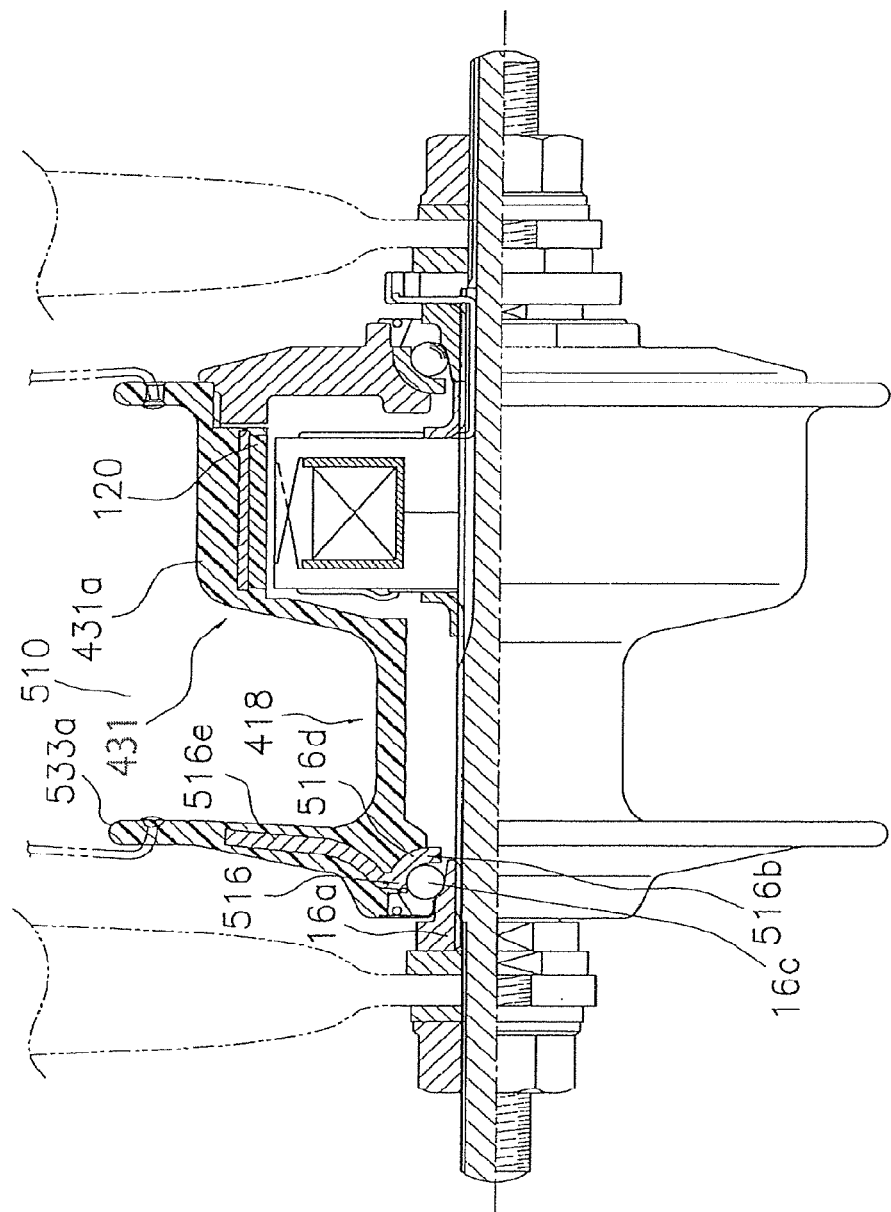
FIG. 9 is partial cross-sectional view, similar to FIG. 2, of a generator hub in accordance with a sixth embodiment.

Referring now to FIG. 9, a bicycle generator hub 510 according to a sixth embodiment will now be discussed. In this sixth embodiment, the generator hub 510 includes the hub shell 418 of the fifth embodiment. The magnet 120 of the second embodiment is embedded in the shell body 431 of the hub shell 418 such that material of the shell body 431 (e.g., a magnet holder) is disposed on both oppositely facing axial faces to retain the magnet 120 as an integral unit with the hub shell 418. However, the generator hub 510 according to the sixth embodiment has a first bearing 516 with a first ball bearing member 516*b* being shaped differently than in the fifth embodiment. Otherwise, the constituent features of the sixth embodiment are the same as in the fifth embodiment. Thus, explanations of parts that are the same as in the prior embodiments are omitted for the sake of brevity. In FIG. 9, parts and portions that are shaped differently than in the previously explained embodiments are indicated with reference numerals in the 500s.

As shown in FIG. 9, the first ball bearing member 516*b* of the first bearing 516 includes a cup-shaped first ball bearing portion 516*d* and a first reinforcing portion 516*e*. The first ball bearing portion 516*d* contacts the first steel balls 16*c*. The first reinforcing portion 516*e* is provided on an outer circumferential portion of the first ball bearing portion 516*d*. The first reinforcing portion 516*e* is substantially dish shaped and extends substantially in a radial direction of the hub shaft 15 from the outer circumferential portion of the first ball bearing portion 516*d*. The first reinforcing portion 516*e* curves slightly toward an inward portion of the first hub flange 533*a*. As a result, the strength of the first reinforcing portion 516*e* is increased. The shell body 431 is formed by injection molding such that the shell body 431 becomes an integral unit with the magnet 120 and the first ball bearing member 516*b* of the first bearing 516. The first ball bearing member 516*b* is made by press forming a thin sheet metal material, e.g., a stainless steel sheet or plate. By providing the first reinforcing portion 516*e*, the shell body 431 can be made out of synthetic resin without causing the strength of portion of the shell body 431 where the first flange 533 is formed to decline and the weight of the generator hub 510 can be reduced.

Seventh Embodiment

Figure 10:
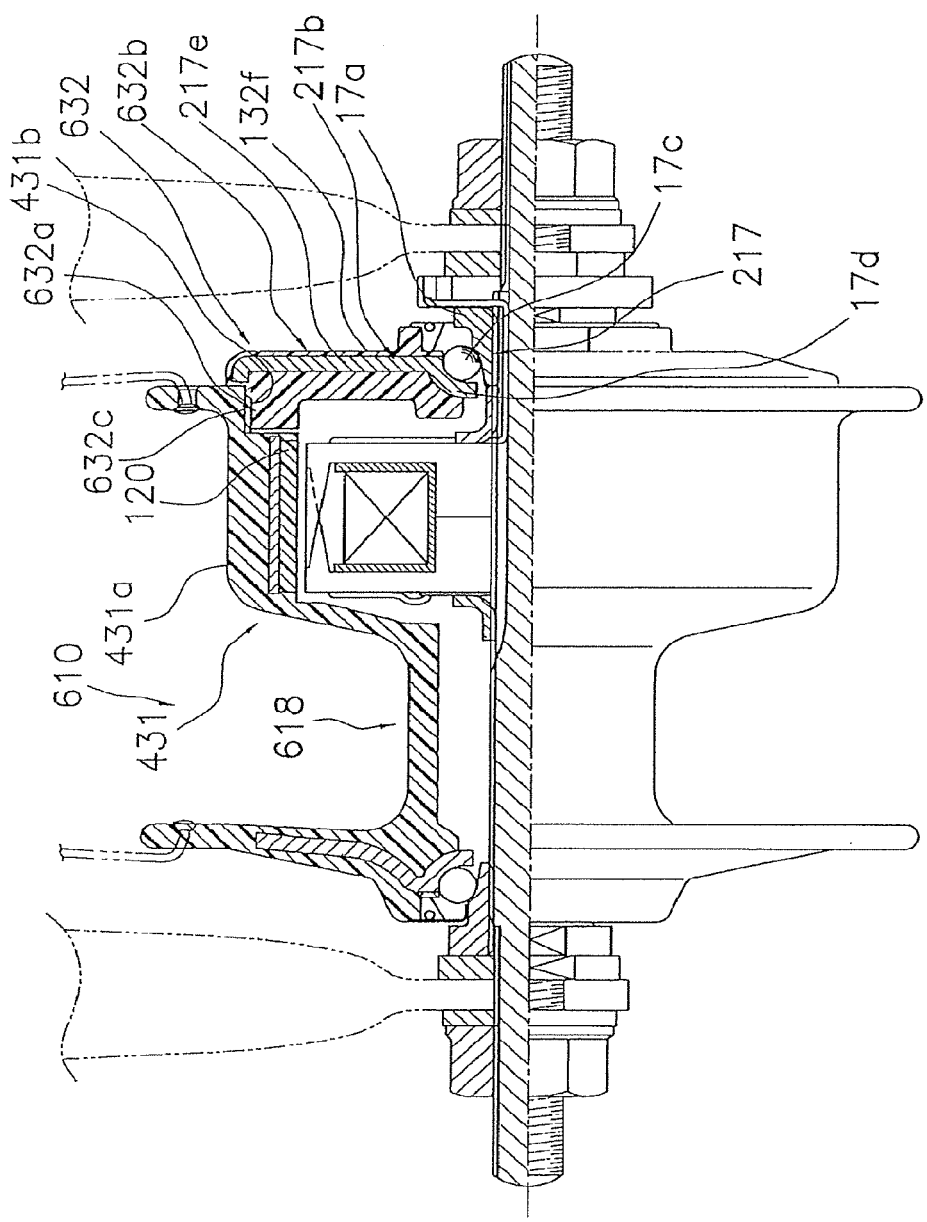
FIG. 10 is partial cross-sectional view, similar to FIG. 2, of a generator hub in accordance with a seventh embodiment.

Referring now to FIG. 10, a bicycle generator hub 610 according to a seventh embodiment will now be discussed. In this seventh embodiment, the generator hub 610 includes a hub shell 618 that is similar to the fourth and fifth embodiments. The magnet 120 of the second embodiment is embedded in the shell body 431 of the hub shell 618 such that material of the shell body 431 (e.g., a magnet holder) is disposed on both oppositely facing axial faces to retain the magnet 120 as an integral unit with the hub shell 618. The hub shell 618 of the generator hub 610 according to the seventh embodiment is different than in the hub shell 518 of the sixth embodiment hub shell 418 in that the hub shell 618 includes a lid member 632 with the second ball bearing member 217*b* of the second bearing 217 being embedded in the material of the lid member 632. Otherwise, the constituent features are the same as the sixth embodiment shown in FIG. 9. Thus, explanations of parts that are the same as in the prior embodiments are omitted for the sake of brevity. In FIG. 10, parts and portions that are shaped differently than in the other embodiments are indicated with reference numerals in the 600s.

The lid member 632 shown in FIG. 10 is made of a synthetic resin. The lid member 632 is basically configured the same as the lid member 232 of the third embodiment shown in FIG. 6, except that the lid member 632 does not hold a magnet. Thus, in the seventh embodiment, the entire hub shell 618 is made of a synthetic resin. Parts and portions that are the same as in the prior embodiments are indicated with the same reference numerals in this seventh embodiment.

The lid member 632 has a threaded cylindrical portion 632*a* that is screw-fastened to the shell body 431 by being screwed into the second end side of the shell body 431. The threaded cylindrical portion 632*a* has an externally threaded portion 632*c* provided on a first cylindrical portion 632*d*. The axial length of the first cylindrical portion 632*d* is shorter than the axial length of the first cylindrical portion 32*d* of the first embodiment. Therefore, the overall axial length of the threaded cylindrical portion 632*a* of the seventh embodiment is shorter than the overall axial length of the threaded cylindrical portion 32*a* of the first embodiment at least partially because the threaded cylindrical portion 332*a* does not have a second cylindrical portion.

The lid member 632 is formed by injection molding such it becomes an integral unit with the second ball bearing member 217*b* of the second bearing 217. Otherwise, the constituent features of the lid member 632 are the same as the lid member 132 shown in FIG. 6. Therefore, a second reinforcing portion 217*e* is provided on the second ball bearing member 217*b* of the second bearing 217.

Eighth Embodiment

Figure 11:
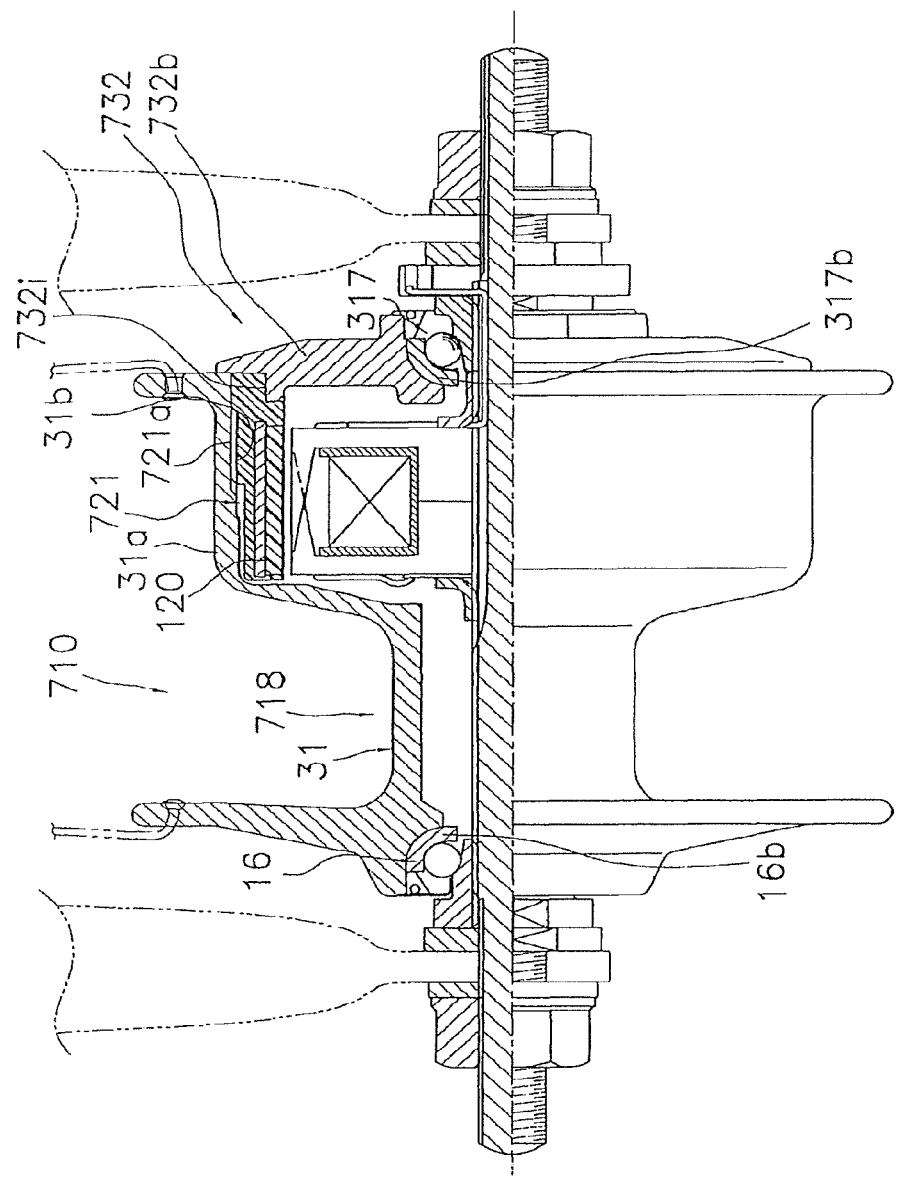
FIG. 11 is partial cross-sectional view, similar to FIG. 2, of a generator hub in accordance with an eighth embodiment.

Referring now to FIG. 11, a bicycle generator hub 710 according to an eighth embodiment will now be discussed. In this eighth embodiment, the generator hub 710 includes a metal hub shell 718. In the first to seventh embodiments, the lid member or the entire shell body serves as the magnet holder of the generator hub and the lid member or shell body is formed using a mold or die. However, in the eighth embodiment, the magnet 120 of the second embodiment is embedded in a magnet holder 721 that is provided in a portion of a lid member 732 of the hub shell 718, as shown in FIG. 11. The magnet 120 is embedded in the magnet holder 721 such that material of the magnet holder 721 is disposed on both oppositely facing axial faces to retain the magnet 120 as an integral unit with the magnet holder 721. Also, in this eighth embodiment, the first bearing 16 of the first embodiment is used on one end of the hub shell 718, while the second bearing 317 of the fourth embodiment is used on the other end of the hub shell 718. In particular, the first ball bearing member 16*b* of the first bearing 16 is press fitted into the shell body 31, while the second ball bearing member 317*b* of the second bearing 317 is press fitted into the lid member 732. Otherwise, the constituent features of the eighth embodiment are the same as in the first embodiment illustrated in FIG. 2. Thus, explanations of parts that are the same as in the prior embodiments are omitted for the sake of brevity. In FIG. 11, parts and portions that are shaped differently than in the previously explained embodiments are indicated with reference numerals in the 700s.

The lid member 732 has a rotary support portion 732*b* made of die cast aluminum and. The lid member 732 also has a step-like portion 732*i* comprising a ring-shaped recess that is formed in an outer circumferential portion of the rotary support portion 732*b*. The magnet holder 721 is formed to be incorporated integrally on the step-like portion 732*i*. The step-like portion 732*i* is provided with a rotation prevention structure that can include one or more recesses and/or one or more protrusions (not shown) for preventing rotation of the magnet holder 721 relative to the lid member 732

The magnet holder 721 is made by injection molding using, for example, a polybutylene terephthalate resin, a polyamide resin, a polyacetal resin, or another synthetic resin. The magnet holder 721 has a similar shape to the threaded cylindrical portion 132*a* (FIG. 5) of the second embodiment. The magnet 120 is arranged on an internal circumferential surface of the magnet holder 721. The magnet holder 721 has an externally threaded portion 721*a* that is provided on an external circumferential surface of the magnet holder 721. The externally threaded portion 721*a* meshes with the internally threaded portion 31*b* that is formed on the internal circumferential surface of a bulged portion 31*a* of the shell body 31. The magnet holder 721 has such a length that the magnet holder 721 can contact and cover both end faces of the magnet 120. The magnet holder 721 is fitted together with an internal circumferential surface of the bulged portion 31*a* such that the magnet holder 721 is arranged coaxially with respect to the shell body 31. The magnet holder 721 is injection molded using a die such that becomes an integral unit with the magnet 120 and the rotary support portion 732*b*. The magnet holder 721 is formed such that the magnet holder 721 is prevented from rotating with respect to the rotary support portion 732*b* by the rotation prevention structure. The magnet 120 is a bond magnet like that presented in the second embodiment and the yoke member 145 is formed integrally onto the outer circumference of the magnet 120. The integral unit comprising the magnet 120 and the yoke member 145 is formed integrally into the magnet holder 721.

Ninth Embodiment

Figure 12:
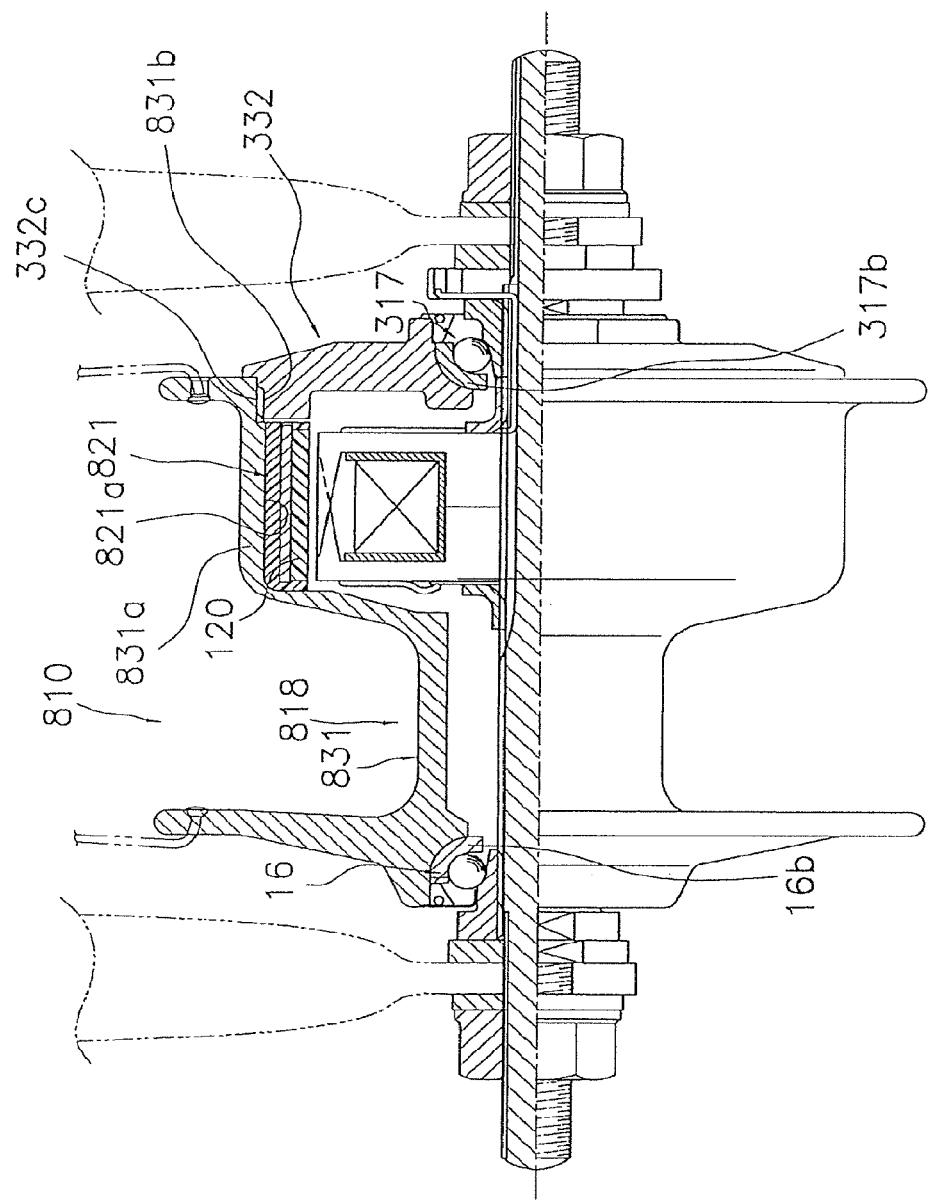
FIG. 12 is partial cross-sectional view, similar to FIG. 2, of a generator hub in accordance with a ninth embodiment.

Referring now to FIG. 12, a bicycle generator hub 810 according to an ninth embodiment will now be discussed. In this ninth embodiment, the generator hub 810 includes a metal hub shell 818. In the generator hub 810 according to the ninth embodiment, a magnet holder 821 is embedded in a portion of a shell body 831 of the hub shell 818 as shown in FIG. 12. Material of the magnet holder 721 is disposed on both oppositely facing axial faces of the magnet 120 to retain the magnet 120 as an integral unit with the magnet holder 721. Also, in this ninth embodiment, the first bearing 16 of the first embodiment is used on one end of the hub shell 718, while the second bearing 317 of the fourth embodiment is used on the other end of the hub shell 718. In particular, the first ball bearing member 16*b* of the first bearing 16 is press fitted into the shell body 831, while the second ball bearing member 317*b* of the second bearing 317 is press fitted into the lid member 332. Otherwise, the constituent features of the ninth embodiment are the same as in the fourth embodiment illustrated in FIG. 7. Thus, explanations of parts that are the same as in the prior embodiments are omitted for the sake of brevity. In FIG. 12, parts and portions that are shaped differently than in the previously explained embodiments are indicated with reference numerals in the 800s.

The shell body 831 has a mounting portion 821*a* on an internal circumferential surface of a bulged portion 831*a* for installing the magnet holder 821. The mounting portion 821*a* has such a length that the magnet holder 821 can cover both axially facing end faces of the magnet 120. The shell body 831 has an internally threaded portion 831*b* that meshes with an externally threaded portion 332*c* of the lid member 332. The externally threaded portion 332*c* of the lid member 332 is formed on an internal circumferential surface of a second end side (right side in FIG. 12) of the mounting portion 821*a*.

The magnet holder 821 is made by injection molding using, for example, a polybutylene terephthalate resin, a polyamide resin, a polyacetal resin, or another synthetic resin. The magnet 120 is arranged in an internal circumferential surface of the magnet holder 721. When the magnet holder 821 is formed by injection molding, a die is used such that the magnet holder 821 becomes an integral unit with the mounting portion 821*a*. Also, when the magnet holder 821 is formed by injection molding, a die is used such that the magnet holder 821 becomes an integral unit with the magnet 120. Furthermore, when the magnet holder 821 is formed such that the magnet holder 821 is integral with the mounting portion 821*a*, the magnet holder 821 is also formed in such a state that the magnet holder 821 is prevented from rotating with respect to the mounting portion 821*a* by a rotation prevention structure.

The magnet 120 is a bond magnet like that presented in the second embodiment and the yoke member 145 is formed integrally onto an outer circumference of the magnet 120. The magnet holder 821 is formed to be an integral unit with the magnet 120 on which the yoke member 145 is integrally formed.

With the generator hubs 10, 110, 210, 310, 410, 510, 610, 710 and 810 constructed as described above, the magnet 20 or 120 can be arranged precisely coaxially with respect to the hub shaft 15. As a result, the size of the gap between the magnet 20 or 120 and the stator 19 is stable, and thus, the output of the generator hub is stable. Also, in addition to obtaining a stable output, the output can be increased because the gap between the magnet 20 or 120 and the stator 19 can be made slightly smaller. Conversely, in addition to obtaining a stable output, contact between the magnet 20 or 120 and the stator 19 can be more reliably avoided by making the gap between the magnet 20 or 120 and the stator 19 slightly larger.

Additionally, the manufacturing process for the generator hubs 10, 110, 210, 310, 410, 510, 610, 710 and 810 can be made more simple and stable and the yield can be increased. For example, when a magnet is secured with an adhesive, it is necessary to provide steps for checking if the magnet 20 or 120 is peeling off, managing the adhesive, and using an organic solvent. With the embodiments described heretofore, such steps are not necessary.

In the previously explained embodiments, the generator hubs 10, 110, 210, 310, 410, 510, 610, 710 and 810 are configured to be used with a front wheel and mounted to the front fork 102a. However, the generator hubs 10, 110, 210, 310, 410, 510, 610, 710 and 810 are not limited to use with a front wheel. Rather, the generator hubs 10, 110, 210, 310, 410, 510, 610, 710 and 810 can also be configured so as to be used with the rear wheel 107 and mounted onto the rear fork ends 102b.

In the previously explained embodiments, each of the generator hubs 10, 110, 210, 310, 410, 510, 610, 710 and 810 has a claw pole structure. However, the generator hubs 10, 110, 210, 310, 410, 510, 610, 710 and 810 can also be configured used other types of electric generator mechanisms that do not have a claw pole structure.

Furthermore, in the previously explained embodiments, the yoke has a claw pole structure and the stator yoke 47 and the core yoke 48 are formed as an integral unit. However, it is also acceptable if the stator yoke and core yoke are provided as separate entities.

In the previously explained embodiments, the magnet is a cylindrical bond magnet or a cylindrical magnet made of sintered metal. However, the generator hubs 10, 110, 210, 310, 410, 510, 610, 710 and 810 are not limited to such a cylindrical magnet, and it is acceptable to use a plurality of magnets arranged with equal spacing in-between in a circumferential direction such that the entire arrangement has a cylindrical shape. In such a case, the magnet holders of the generator hubs 10, 110, 210, 310, 410, 510, 610, 710 and 810 are even more effective because it is difficult to arrange the magnets precisely using an adhesive or the like.

In the previously explained embodiments, when a part is made of a synthetic resin, such engineering plastics as polybutylene terephthalate resin, polyamide resin, and polyacetal resin are used. However, the magnet holders of the generator hubs are not limited to such synthetic resins. For example, synthetic resins called "super engineering plastics" can also be used. Meanwhile, in other embodiments, the metal parts (e.g., the magnet holders) are made of die cast aluminum. However, the metal parts (e.g., the magnet holders) are not limited to die cast aluminum, and it is acceptable to use titanium, steel treated with a surface coating, or another metal.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle generator hub comprising:
   a hub shaft;
   a hub shell rotatably arranged on the hub shaft;
   a stator fixed to the hub shaft; and
   a magnet arranged in the hub shell facing opposite the stator,
   the hub shell including a magnet holder having the magnet embedded in the magnet holder, with material of the magnet holder disposed on both oppositely facing axial faces such that the magnet holder retains the magnet as an integral unit.

2. The bicycle generator hub according to claim 1, wherein the hub shell is rotatably support on the hub shaft by a bearing that includes a ball bearing member, with the ball bearing member being embedded in the magnet holder such that the ball bearing member is part of the integral unit that includes the magnet holder and the magnet.

3. The bicycle generator hub according to claim 2, wherein the magnet holder is primarily a synthetic resin member; the ball bearing member is a metal member.

4. The bicycle generator hub according to claim 3, wherein the ball bearing member includes a ball bearing portion and a reinforcing portion, with the reinforcing portion extending from an outer circumferential portion of the ball bearing portion in a substantially radial direction with respect to the hub shaft.

5. The bicycle generator hub according to claim 1, wherein the hub shell includes a cylindrical shell body and a lid member, with the cylindrical shell body having an axially facing opening at one end and the lid member being at least partially closing the axially facing opening of the shell body, the lid member includes the magnet holder.

6. The bicycle generator hub according to claim 2, wherein the hub shell includes a cylindrical shell body and a lid member, with the cylindrical shell body having an axially facing opening at one end and the lid member being at least partially closing the axially facing opening of the shell body, the lid member includes the magnet holder.

7. The bicycle generator hub according to claim 3, wherein the hub shell includes a cylindrical shell body and a lid member, with the cylindrical shell body having an axially facing opening at one end and the lid member being at least partially closing the axially facing opening of the shell body, the lid member includes the magnet holder.

8. The bicycle generator hub according to claim 4, wherein the hub shell includes a cylindrical shell body and a lid member, with the cylindrical shell body having an axially facing opening at one end and the lid member being at least partially closing the axially facing opening of the shell body, the lid member includes the magnet holder.

9. The bicycle generator hub according to claim 1, wherein the hub shell includes a cylindrical shell body and a lid member, with the cylindrical shell body having an axially facing opening at one end and the lid member being at least partially closing the axially facing opening of the shell body, the shell body includes the magnet holder.

10. The bicycle generator hub according to claim 2, wherein
   the hub shell includes a cylindrical shell body and a lid member, with the cylindrical shell body having an axially facing opening at one end and the lid member being at least partially closing the axially facing opening of the shell body, the shell body includes the magnet holder.

11. The bicycle generator hub according to claim 3, wherein
the hub shell includes a cylindrical shell body and a lid member, with the cylindrical shell body having an axially facing opening at one end and the lid member being at least partially closing the axially facing opening of the shell body, the shell body includes the magnet holder.

12. The bicycle generator hub according to claim 4, wherein
the hub shell includes a cylindrical shell body and a lid member, with the cylindrical shell body having an axially facing opening at one end and the lid member being at least partially closing the axially facing opening of the shell body, the shell body includes the magnet holder.

* * * * *